(12) United States Patent
Bohn (10) Patent No.: US 6,626,636 B2
(45) Date of Patent: Sep. 30, 2003

(54) COLUMN AIRFLOW POWER APPARATUS

(75) Inventor: Jerry W. Bohn, Barrington, IL (US)

(73) Assignee: AWA Research, LLC, Denver, CO (US)

( * ) Notice: Subject to any disclaimer, the term of this patent is extended or adjusted under 35 U.S.C. 154(b) by 0 days.

(21) Appl. No.: 09/923,158

(22) Filed: Aug. 6, 2001

(65) Prior Publication Data

US 2003/0026684 A1 Feb. 6, 2003

(51) Int. Cl.[7] .............................................. F04D 1/00
(52) U.S. Cl. .............................. 415/1; 415/4.2; 415/4.4; 415/150; 415/909; 290/55
(58) Field of Search .................... 415/4.1, 4.2, 4.3, 415/4.4, 4.5, 909, 148, 150; 290/55

(56) References Cited

U.S. PATENT DOCUMENTS

| | | | |
|---|---|---|---|
| 58,397 A | * 10/1866 | Ensign | 415/4.2 X |
| 129,567 A | * 7/1872 | Jones | 415/4.5 X |
| 273,920 A | 3/1883 | Walker | |
| 695,524 A | * 3/1902 | Woodell | 290/55 |
| 1,112,203 A | * 9/1914 | Fandrey | 415/4.4 X |
| 1,311,193 A | * 7/1919 | Uecke | 415/4.3 |
| 1,464,575 A | 8/1923 | McGraw | |
| 1,599,944 A | 9/1926 | Baumgart | |
| 2,310,828 A | 2/1943 | Back | |
| D136,467 S | 10/1943 | Murray | |
| 3,302,552 A | * 2/1967 | Walsh | 415/4.3 |
| 3,661,070 A | 5/1972 | Miller | |
| D242,355 S | 11/1976 | Kumada | |
| 4,017,205 A | 4/1977 | Bolie | |
| 4,018,543 A | 4/1977 | Carson et al. | 290/55 X |
| 4,275,309 A | 6/1981 | Lucier | 290/55 X |
| 4,309,146 A | * 1/1982 | Hein et al. | 415/4.2 |
| 4,406,579 A | * 9/1983 | Gilson | 415/90 X |
| 4,491,740 A | 1/1985 | Siegal | 290/55 |
| 4,935,639 A | * 6/1990 | Yeh | 290/55 X |
| 4,963,761 A | 10/1990 | Wight | 290/55 |
| 5,005,357 A | 4/1991 | Fox | |
| 5,365,975 A | 11/1994 | Cote | |
| 5,381,048 A | * 1/1995 | Baird | 290/55 X |

FOREIGN PATENT DOCUMENTS

| | | |
|---|---|---|
| JP | 57-137657 | 8/1982 |
| JP | 57-206781 | 12/1982 |
| WO | WO 94/20752 | 9/1994 |

* cited by examiner

Primary Examiner—Edward K. Look
Assistant Examiner—Dwayne J. White
(74) Attorney, Agent, or Firm—Emery L. Tracy (57) ABSTRACT

A column airflow power apparatus for creating mechanical power is provided. The column airflow power apparatus comprises a column structure having an open first end and an open second end with airflow moving through the column structure from the first end to the second end. A rotatable blade is mounted within the column structure with the airflow rotating the rotatable blade. A power shaft is connected to the rotatable blade with the power shaft rotating with the rotatable blade. A rotatable turret device is mounted to the second end of the column structure and an adjustable airfoil mounted to the rotatable turret. An air concentrator can be mounted within the column structure between the first end and the rotatable blade.

20 Claims, 7 Drawing Sheets

COLUMN AIRFLOW POWER APPARATUS

BACKGROUND OF THE INVENTION

1. Field of the Invention

This invention relates generally to an apparatus for generating mechanical power and, more particularly, it relates to a column airflow power apparatus for generating mechanical power utilizing airflow through a column structure.

2. Description of the Prior Art

The generation of mechanical power plays a significant role in many areas of modern society. For example, generators, pumps, and industrial equipment require mechanical power to operate. Due to the critical role mechanical power plays in the successful operation of these devices and the shortage of energy from other sources, it is essential that each device receives efficient and effective power from the chosen source.

Heretofore, mechanical power devices often have relied upon fossil fuels, open blade wind sources, and/or hydro methods to generate power. These methods, however, are hindered by cost, shortages, environmental impact, maintenance issues, and/or outright failure.

Accordingly, there exists a need for an improved column airflow power apparatus for efficient and effective generation of mechanical power. Additionally, a need exists for a column airflow power apparatus which increases the velocity of airflow through the column structure by concentrating the airflow to a desired location. Furthermore, there exists a need for a column airflow power apparatus which increases the amount of airflow through the column structure by reducing the pressure of the air at the top of the column structure relative to the bottom of the column structure. Further yet, a need exists for a column airflow power apparatus which heats the air within the column structure reducing icing through the column structure, starting/inducing the airflow within the column structure, and increasing the amount of airflow through the column structure.

SUMMARY

The present invention is a column airflow power apparatus for creating mechanical power. The column airflow power apparatus comprises a column structure having an open first end and an open second end with airflow moving through the column structure from the first end to the second end. A rotatable blade is mounted within the column structure with the airflow rotating the rotatable blade. A power shaft is connected to the rotatable blade with the power shaft rotating with the rotatable blade. A rotatable turret device can be mounted to the second end of the column structure and an adjustable airfoil mounted to the rotatable turret. An air concentrator can be mounted within the column structure between the first end and the rotatable blade.

The present invention additionally includes a column airflow power apparatus for creating mechanical power. The column airflow power apparatus comprises a column structure having a first end and an open second end with the column structure having at least one slot nearingly adjacent the first end allowing airflow through the column structure from the first end to the second end. A rotatable blade is mounted within the column structure, the airflow rotating the rotatable blade. A power shaft connected to the rotatable blade with the power shaft rotating with the rotatable blade. An air concentrator is mounted within the column structure between the first end and the rotatable blade.

The present invention further includes a method for creating mechanical power from an airflow. The method comprises introducing an airflow through a column structure, concentrating the airflow to a rotatable blade, rotating the rotatable blade with the airflow, and creating low pressure at the airflow exit of the column structure.

DETAILED DESCRIPTION OF THE PREFERRED EMBODIMENTS

Figure 1:
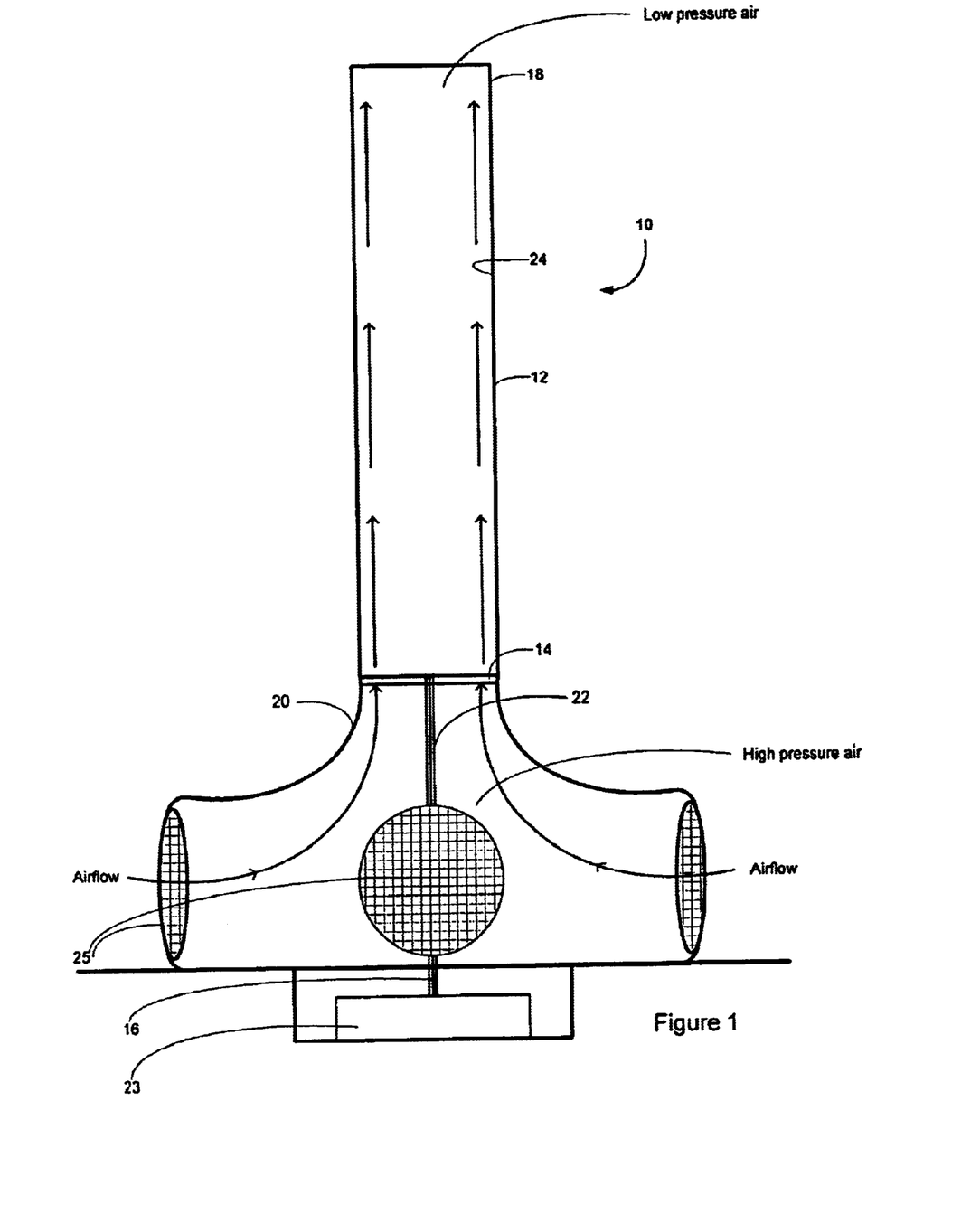
FIG. 1 is an elevational side view of a column airflow power apparatus, constructed in accordance with the present invention, with a column structure having a bottom end and a top end.

As illustrated in FIG. 1, the present invention is a column airflow power apparatus, indicated at 10, for creating mechanical power using outbound airflow within a column structure 12. The column airflow power apparatus 10 of the present invention utilizes the outbound airflow within the column structure to rotate a rotating blade 14 which in turn drives a power shaft 16. Outbound airflow occurs when a pressure differential exists between a top end 18 and a bottom end 20 of the column structure 12. The column airflow power apparatus 10 will now be described in detail.

The column airflow power apparatus 10 of the present invention, as discussed briefly above, includes the column structure 12 having the rotating blade 14, the power shaft 16 connected to the rotating blade 14, and a blade support 22 for supporting the rotating blade 14 and/or the power shaft 16. The rotation of the rotating blade 14 and the power shaft 16 creates a power source for a generator 23, a pump, industrial equipment, etc.

The column structure 12 includes the top end 18, a bottom end 20 substantially opposite the top end 18, and an internal surface 24 between the top end 18 and the bottom end 20. Preferably, at least one airflow inlet 25 is formed in the column structure 12 nearingly adjacent the bottom end 20 and the top end 18 is open allowing the air to enter the column structure 12 near the bottom end 20, travel through the column structure 12 in a general direction from the bottom end 20 to the top end 18, and exit the column structure 12 through the top end 18. A sliding door 27 can be provided over each of the airflow inlets 25 which can be opened and closed depending on the wind direction and the desired amount of airflow through the column structure 12. It should be noted that the airflow inlets 25 can be any desired size and can be individually closed depending on the direction and strength of the wind.

To ensure optimum performance and a consistent, reliable external wind source with minimal turbulence, the height of the column structure 12 ranges from between thirty (30') feet to five hundred (500') feet. It is within the scope of the present invention, however, to have a column structure 12 height less than thirty (30') feet and a column structure 12 height greater than five hundred (500') feet. It should be noted that the column structure 12 can be positioned on the ground or on a platform above the ground or above the water (similar to an oil drilling platform) to allow unobstructed airflow into the airflow inlets 25 of the column structure 12.

The column structure 12 can be constructed from any suitable material including, but not limited to brick, cement, steel, etc. The internal surface 24 of the column structure 12 can vary in width, size, or texture to match airflow velocity with the desired application. Furthermore, the internal surface 24 of the column structure 12 can be rifled along the entire length of the column structure 12, along only certain lengths of the column structure 12, or at any point along the column structure 12 to enhance the airflow through the column structure 12.

Figure 4:
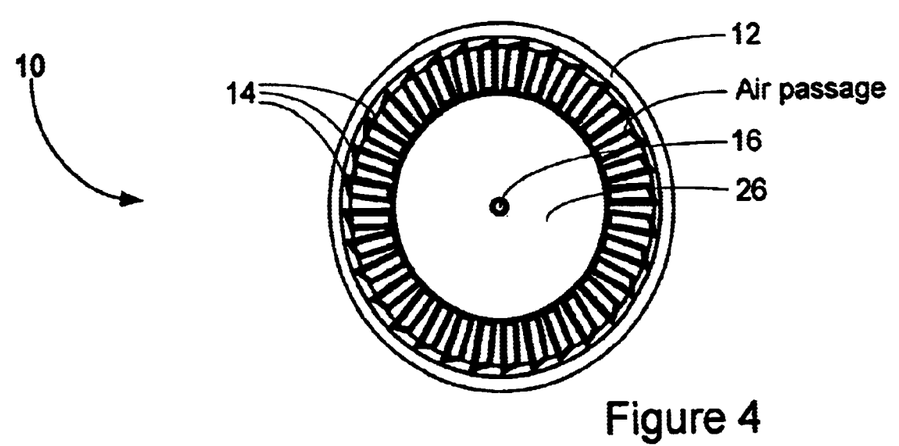
FIG. 4 is a bottom plan view illustrating the upwind side of the column airflow power apparatus of FIG. 3, constructed in accordance with the present invention, with a blade mounted within the column structure.
Figure 5:
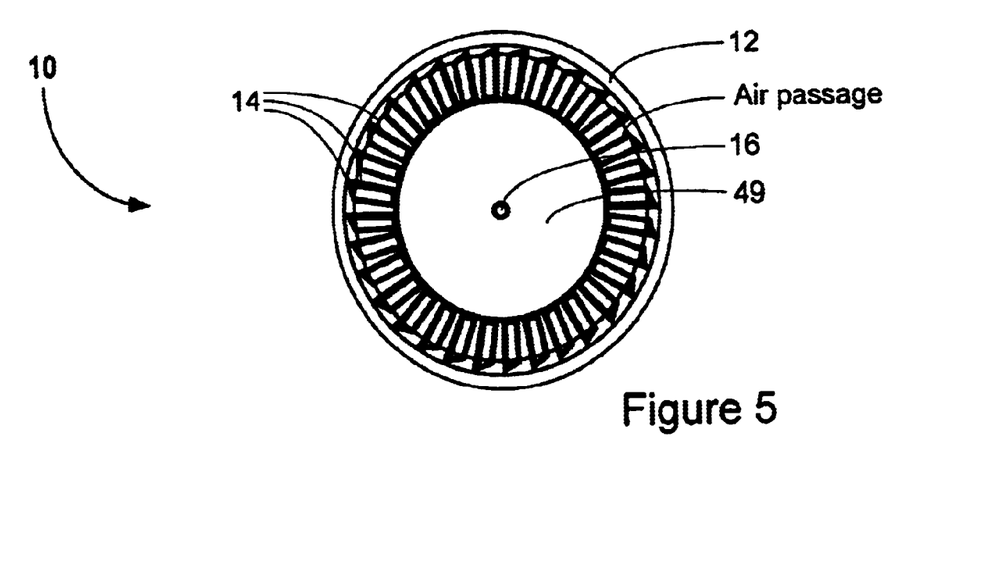
FIG. 5 is a top plan view illustrating the column airflow power apparatus of FIG. 3, constructed in accordance with the present invention, with a blade mounted within the column structure.

The rotating blade 14 of the column airflow power apparatus 10 is mounted upon the blade support 22 within the column structure 12 between the top end 18 and the bottom end 20 of the column structure 12 and freely rotates within the internal surface 24 of the column structure 12. As illustrated in FIGS. 4 and 5, the rotating blade 14 rotatably mounted within the column structure 12 can contain two (2) blades, three (3) blades, or more blades, or even a turbine-like blade. A hub 49 maintains the rotating blade 14 on the blade support 22. Additionally, the rotating blade 14 can be a fixed pitch or a variable pitch type blade. The rotating blade 14 can also incorporate a governor to limit rotation speed, if desired by the user. Furthermore, using a plurality of rotating blades 14 is within the scope of the present invention.

Figure 2:
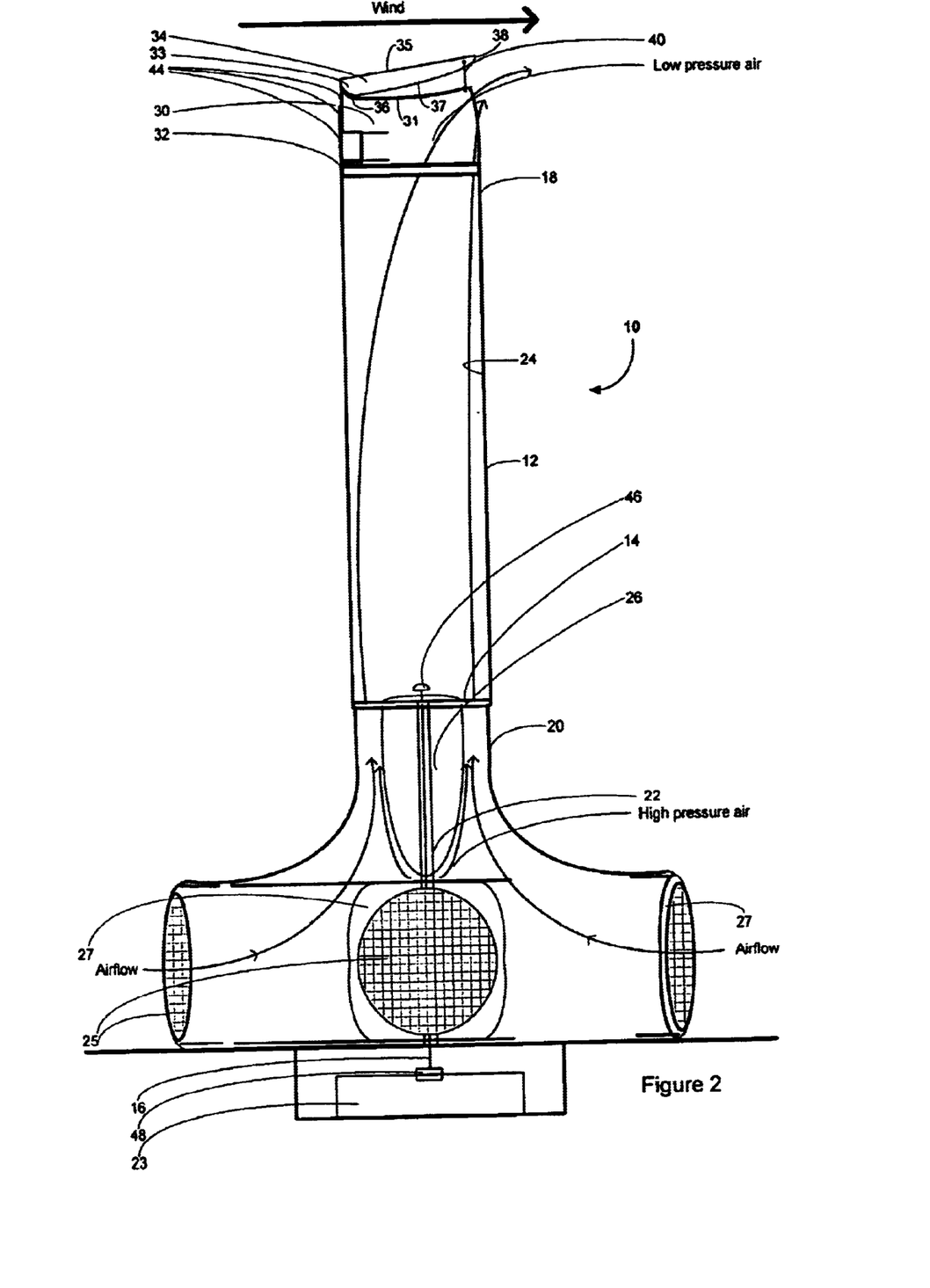
FIG. 2 is an elevational side view of the column airflow power apparatus of FIG. 1, constructed in accordance with the present invention, with an air concentrator mounted between the bottom end of the column structure and the rotatable blade and a turret device and airfoil mounted to the top end of the column structure.
Figure 3:
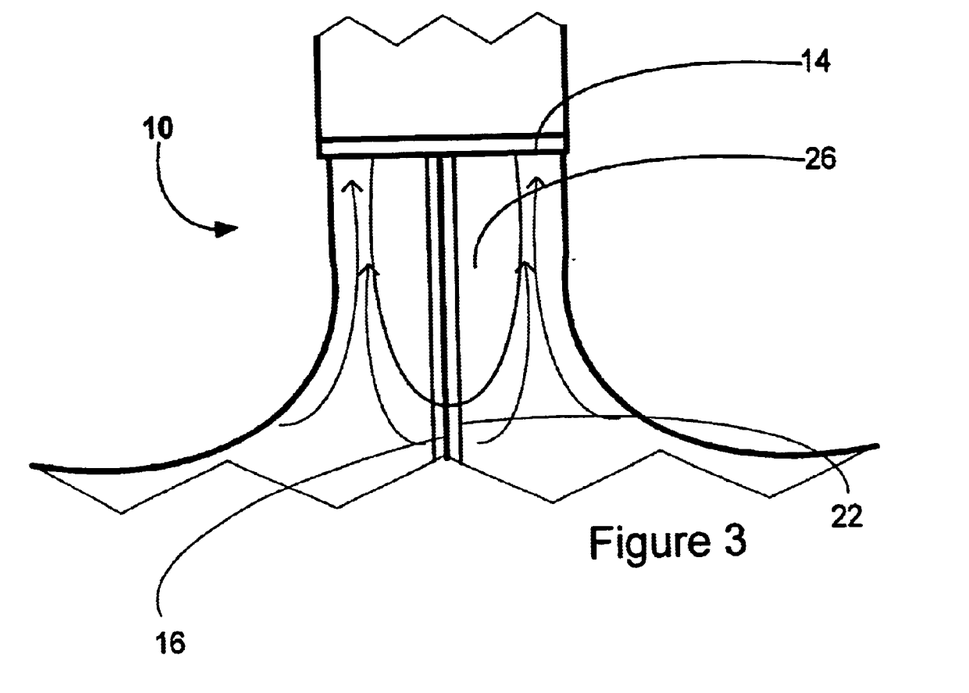
FIG. 3 is an elevational side view of the concentrator, constructed in accordance with the present invention.

In an embodiment of the present invention, as illustrated in FIGS. 2 and 3, the column airflow power apparatus 10 includes an air stream concentrator 26 to intensify and increase the airflow velocity through the column structure 12. The air stream concentrator 26 is mounted within the column structure 12 below the rotating blade 14 to force the outbound airflow to concentrate and hit the edge of the rotating blade 14. As the airflow enters the column structure 12 through the opening near the bottom end 20 of the column structure 12, the air stream concentrator 26 concentrates the airflow below the rotating blade 14 traveling toward the top end 18 of the column structure 12 thereby directing the airflow to outer edges of the rotating blade 14 (approximately the outer ⅓ of the rotating blade 14). By using the air stream concentrator 26, the mechanical advantages of the rotating blade 14 is increased thereby creating more power from the same column structure 12. In other words, the concentration of the airflow will increase the mechanical advantage/lever effect of the rotating blade 14.

The air stream concentrator 26 can be exponentially shaped, cone-shaped, or have a shape deemed best suited to concentrate airflow for the given application. Furthermore, while the present invention has been described as having an air stream concentrator 26 which directs the airflow to the outer edges of the rotating blade 14, it should be noted that it is within the scope of the present invention to have any type of air stream concentrator 26 to direct the airflow to any part of the rotating blade 14 including, but not limited to, the outer part of the rotating blade 14.

Figure 6:
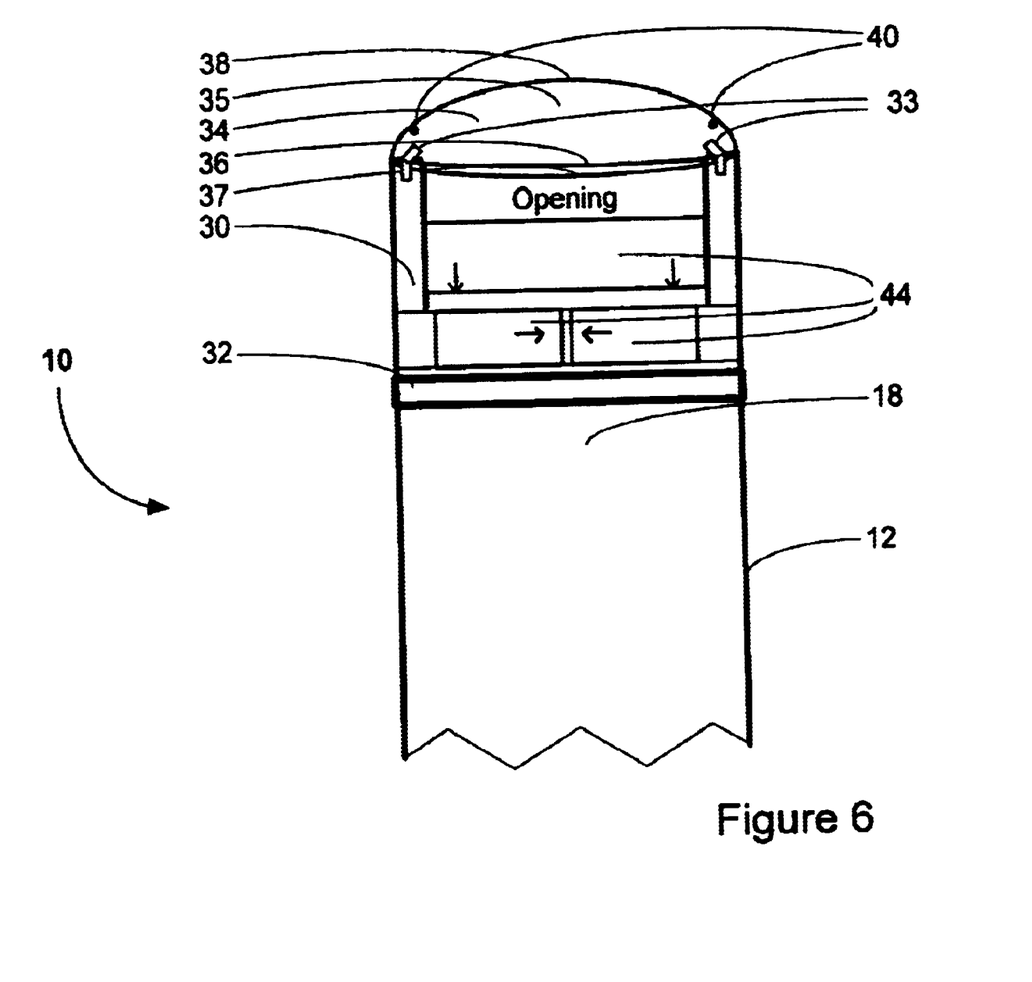
FIG. 6 is an elevational front view illustrating the upwind side of the column airflow power apparatus of FIG. 2, constructed in accordance with the present invention, with the column structure having the turret device and airfoil.
Figure 7:
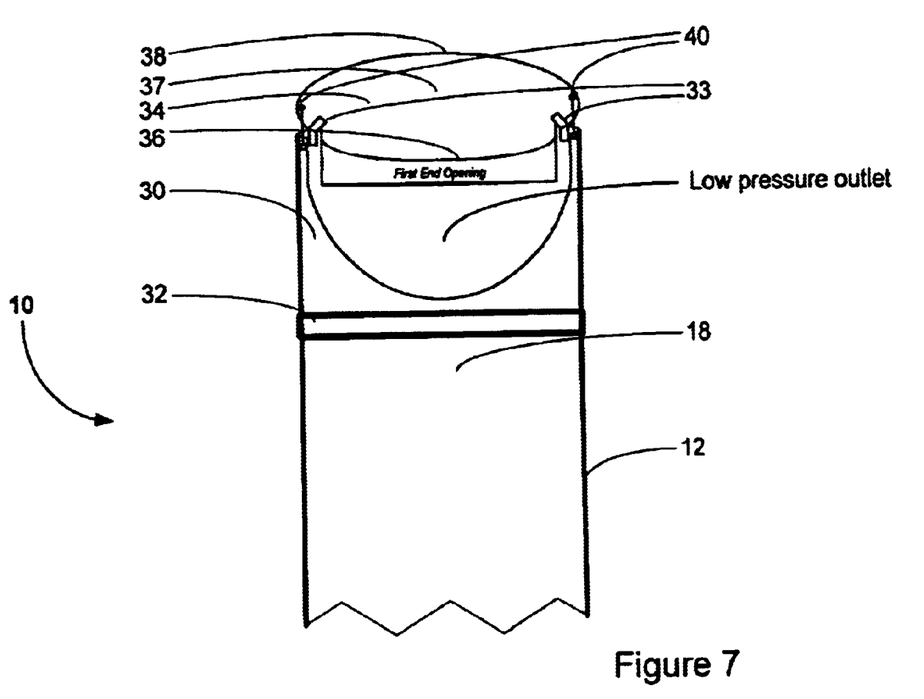
FIG. 7 is an elevational front view illustrating the downwind side of the column airflow power apparatus of FIG. 2, constructed in accordance with the present invention, with the column structure having the turret device.

In another embodiment of the present invention, as illustrated in FIGS. 6 and 7, the column airflow power apparatus 10 includes a rotatable turret device 30 mounted to the top end 18 of the column structure 12. Rotation means between the turret device 30 and the top end 18 of the column structure 12 allows rotation of the turret device 30 relative to the column structure 12. In a preferred embodiment of the present invention, the rotation means includes a track 32 mounted to the top end 18 of the column structure 12. The track 32 supports the turret device 30 and allows full three hundred and sixty (360°) rotation of the turret device 30 about the top end 18 of the column structure 12.

In still another embodiment of the present invention, the turret device 30 has a hinged wing-like airfoil 34 attached thereto by a hinge device 33. The airfoil 34 has a top side 35, a bottom side 37 substantially opposite the top side 35, a first end 36 between the top side 35 and the bottom side 37, and a second end 38 between the top side 35 and the bottom side 37 and substantially opposite the first end 36. Preferably, the top side 35 of the airfoil 34 has a substantially planar configuration and the bottom side 37 of the airfoil has a substantially curved configuration. By configuring the top side 35 and the bottom side 37 of the airfoil 34 as described, low air pressure is maintained on the substantially curved bottom side 37 while the higher air pressure will be maintained on the substantially planar top side 35 thereby encouraging air flow from the bottom end 20 of the column structure 12 to the top end 18 of the column structure 12.

Preferably, the first end 36 of the airfoil 34 is thicker than the second end 38 of the airfoil 34 with the first end 36 of the airfoil 34 being hingedly connected to the turret device 30 by the hinge device 33 or the like. At least one adjusting rod 40 extends between the turret device 30 and the airfoil 34 allowing adjustment of the height second end 38 of the airfoil 34 relative to the turret device 30. When external wind contacts the column structure 12 of the column airflow power device 10, low pressure under the airfoil 34 intensifies the low pressure present at the top end 18 of the column structure 12, thus intensifying the outbound airflow velocity from the column structure 12.

Preferably, the turret device 30 has a top edge 31 which is substantially curved similar to the curved bottom 37 of the airfoil 34. The curved top edge 31 allows the airfoil 34 to completely close the turret device 30 during high winds or other adverse weather conditions.

The turret device 30/airfoil 34 utilizes external wind speeds above one-half (½ mph) miles per hour to enhance the airfoil's 34 low pressure effect. Preferably, the turret device 30/airfoil 34 will utilize data, i.e., wind speed, wind directions, etc., from sensors (not shown) mounted on or adjacent the turret device 30 to rotate the turret device 30 relative to the column structure 12 and adjust the airfoil 34 via the adjusting rod or rods 40 to optimize the low pressure effect at the top end 18 of the column structure 12. In addition, the sensors will also detect dangerous, high wind conditions to automatically rotate the turret device 30 and/or automatically adjust the height of the adjusting rod or rods 40 to raise and lower the airfoil 34 thereby minimizing potential dangers and damage from high wind speeds and wind gusts. A motor or motors (not shown) can be provided to rotate the turret device 30 and to adjust the adjusting rods 40.

The turret device 30 of the column airflow power device 10 also, preferably, includes at least one adjustable port 44 which can be opened or closed depending on the wind speed and wind direction. The adjustable port 44 should provide an opening of at least ⅓ of the height of the turret device 30 to provide an unobstructed airflow to the bottom side 37 of the airfoil 34 regardless of the position of the airfoil 34 relative to the turret device 30.

The turret device 30 is rotated such that the adjustable ports 44 are positioned on the windward side of the column structure 12 thereby creating a venturi effect on the top end 18 of the column structure 12. Furthermore, the adjustable ports 44 detune any resonant frequencies which might occur with the airflow traveling through the column structure 12.

In another embodiment of the column airflow power device 10 of the present invention, a heat booster 46 can be positioned above the rotating blade 14 to assist in initiating the outbound air flow, to intensify the velocity of the outbound airflow, or to even heat the airflow to reduce icing on the column structure 12. The heat booster 46 can utilize gas or oil fuel or other means of heating the air within the column structure 12.

With the airflow traveling through the column structure 12, the power shaft driven 16 by the rotating blades 14 can directly power a device or utilize a gearbox 48 to best transfer the mechanical power. By utilizing a gearbox 48, one or more devices/device types can be powered from the same power shaft 16.

Furthermore, there can be multiple column structures 12 in close proximity to each other to provide mechanical power to devices requiring the benefits of serial, parallel, or redundant power inputs. It is important for the spacing between multiple column structures 12 must be sufficient to inhibit the creation of turbulence between the multiple column structures 12. Furthermore, it is best to stagger the multiple column structures 12 such that the multiple column structures 12 are not in line in the direction of the prevailing winds.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A column airflow power apparatus for creating mechanical power, the column airflow power apparatus comprising:
    a column structure having an open first end and an open second end, airflow moving through the column structure from the first end to the second end;
    a rotatable blade mounted within the column structure, the airflow rotating the rotatable blade;
    a power shaft connected to the rotatable blade, the power shaft rotating with the rotatable blade;
    a rotatable turret device mounted to the second end of the column structure; and
    an adjustable airfoil mounted to the rotatable turret.

2. The column airflow power apparatus of claim 1 wherein the rotatable blade is selected from the group consisting of two (2) blades, three (3) blades, and turbine-like blade.

3. The column airflow power apparatus of claim 1 wherein the power shaft is connected to a device selected from the group consisting of a generator, a pump, and industrial equipment.

4. The column airflow power apparatus of claim 1 wherein the rotatable turret device has at least one adjustable port, the adjustable port being positioned on a windward side of the column structure.

5. The column airflow power apparatus of claim 1 wherein the rotatable turret device is rotatable three hundred and sixty (360°) degrees about the second end of the column structure.

6. The column airflow power apparatus of claim 1 and further comprising:
    a heat device for initiating outbound air flow, intensifying outbound airflow velocity, and reducing icing on the column structure.

7. The column airflow power apparatus of claim 1 and further comprising:
    an air concentrator mounted within the column structure between the first end and the rotatable blade.

8. The column airflow power apparatus of claim 7 wherein the air concentrator concentrates the airflow to the outer ⅓ of the rotatable blade.

9. The column airflow power apparatus of claim 7 wherein the shape of the air concentrator is selected from the group consisting of exponentially shaped and coneshaped.

10. The column airflow power apparatus of claim 1 and further comprising:
    adjusting means for adjusting the airfoil, the adjusting means automatically raising and lowering the airfoil relative to the turret upon the occurrence of at least one predetermined event.

11. The column airflow power apparatus of claim 10 wherein the adjusting means are at least one sensor and an adjusting rod, the adjusting rod raising and lowering the airfoil when the sensor determines the occurrence of at least one predetermined event.

12. A column airflow power apparatus for creating mechanical power, the column airflow power apparatus comprising:
    a column structure having a first end and an open second end, the first end being flared such that the diameter of the column structure at the first end is greater than the diameter of the column structure at the second end;
    at least one slot formed nearingly adjacent the first end allowing airflow through the column structure from the first end to the second end;
    a rotatable blade mounted within the column structure, the airflow rotating the rotatable blade;
    a power shaft connected to the rotatable blade, the power shaft rotating with the rotatable blade; and
    an air concentrator mounted positioned within the flared first end of the column structure between the first end and the rotatable blade.

13. The column airflow power apparatus of claim 12 wherein the air concentrator concentrates the airflow to the outer ⅓ of the rotatable blade.

14. The column airflow power apparatus of claim 12 wherein the shape of the air concentrator is selected from the group consisting of exponentially shaped and coneshaped.

15. The column airflow power apparatus of claim 12 and further comprising:

a heat device for initiating outbound airflow and reducing icing on the column structure.

16. The column airflow power apparatus of claim 12 and further comprising:

a rotatable turret device mounted to the second end of the column structure; and an adjustable airfoil mounted to the rotatable turret.

17. The column airflow power apparatus of claim 16 wherein the rotatable turret device has at least one adjustable port, the adjustable port being positioned on a windward side of the column structure.

18. The column airflow power apparatus of claim 17 and further comprising:

adjusting means for adjusting the airfoil, the adjusting means automatically raising and lowering the airfoil relative to the turret upon the occurrence of at least one predetermined event.

19. A method for creating mechanical power from an airflow, the method comprising:

introducing an airflow through a column structure, the column structure having a first end and an open second end, the first end being flared such that the diameter of the column structure at the first end is greater than the diameter of the column structure at the second end;

concentrating the airflow within the flared first end to a rotatable blade;

rotating the rotatable blade with the airflow; and concentrating low pressure at the airflow exit of the column structure.

20. The method of claim 19 and further comprising:

heating the air within the column to increase airflow.

* * * * *